(12) United States Patent
Chen

(10) Patent No.: US 6,728,763 B1
(45) Date of Patent: Apr. 27, 2004

(54) ADAPTIVE MEDIA STREAMING SERVER FOR PLAYING LIVE AND STREAMING MEDIA CONTENT ON DEMAND THROUGH WEB CLIENT'S BROWSER WITH NO ADDITIONAL SOFTWARE OR PLUG-INS

(76) Inventor: Ben W. Chen, 1400 Telteca St., Fremont, Alameda, CA (US) 94539

( * ) Notice: Subject to any disclaimer, the term of this patent is extended or adjusted under 35 U.S.C. 154(b) by 651 days.

(21) Appl. No.: 09/588,035

(22) Filed: Jun. 5, 2000

Related U.S. Application Data

(60) Provisional application No. 60/188,341, filed on Mar. 9, 2000.

(51) Int. Cl.[7] ............................................. G06F 15/16
(52) U.S. Cl. .................. 709/219; 709/217; 709/201; 709/224; 709/229; 725/51; 725/110; 725/113; 370/316; 370/338
(58) Field of Search .................. 709/2, 203, 219, 709/201, 217, 218, 224, 229; 370/316, 338, 351, 352; 725/110, 113, 51

(56) References Cited

U.S. PATENT DOCUMENTS

| | | | | |
|---|---|---|---|---|
| 5,617,540 A | * | 4/1997 | Civanlar et al. ........ | 370/395.54 |
| 6,012,086 A | | 1/2000 | Lowell | |
| 6,014,706 A | | 1/2000 | Cannon et al. | |
| 6,314,492 B1 | * | 11/2001 | Allen et al. ............. | 711/135 |
| 6,502,194 B1 | * | 12/2002 | Berman et al. ........... | 713/201 |
| 6,516,338 B1 | * | 2/2003 | Landsman et al. .......... | 709/203 |
| 6,526,580 B2 | * | 2/2003 | Shimomura et al. ........ | 725/63 |
| 6,536,043 B1 | * | 3/2003 | Guedalia ................. | 725/90 |

* cited by examiner

Primary Examiner—David Wiley
Assistant Examiner—Phuoc H. Nguyen
(74) Attorney, Agent, or Firm—Sawyer Law Group LLP

(57) ABSTRACT

A method and system for providing media content in real-time on a web client is disclosed. The web client includes a browser utilizing a cache. The media content can be separated into a plurality of sections. The browser of the web client can read and display a section of the media content without additional software or plug-ins. In one aspect, the method and system include ensuring that the web client can flush the cache to allow the media content to be played in real-time, preferably in response to the web client requesting the media content. In this aspect, the method and system also include providing the plurality of sections of the media content to the web client section by section and allowing the web client to flush the section of the media content from the cache once each of the plurality of section has been displayed. In a second aspect, the method and system include requesting the media content using the web client and ensuring that the web client can flush the cache to allow the media content to be played in real-time. In this aspect, the method and system also include receiving each of the plurality of sections of the media content on the web client section by section, displaying each of the plurality of sections section by section and flushing each section of the media content from the cache once each of the plurality of sections has been displayed.

40 Claims, 7 Drawing Sheets

ADAPTIVE MEDIA STREAMING SERVER FOR PLAYING LIVE AND STREAMING MEDIA CONTENT ON DEMAND THROUGH WEB CLIENT'S BROWSER WITH NO ADDITIONAL SOFTWARE OR PLUG-INS

This application claim the benefit of Provisional aplication Ser. No. 60/188,341, file Mar. 9, 2000.

FIELD OF THE INVENTION

The present invention relates to computer systems, and more particularly to a method and system for allowing media, such as live or streaming media, to be played in real-time on a computer system without requiring the computer system to have additional software or plug-ins.

BACKGROUND OF THE INVENTION

Currently, many conventional systems are available for allowing media content, such as audio or video, to be delivered to web clients over the Internet or a local area network (LAN). The web clients are typically computer systems that are equipped with a virtual machine, typically incorporated into a conventional browser. Web clients might, for example, include a cell phone, personal digital assistant (PDA), Web pad, personal computer, workstation or other device that can connect to the LAN or Internet. Conventional virtual machines in browsers are typically JAVA™ virtual machines. Conventional browsers are used for many functions and are capable of playing certain types of content. For example, conventional browsers are typically capable of receiving, decompressing and displaying, or playing, JPEG image. Conventional browsers are also capable of using GIF file formats. Thus, conventional browsers are typically capable of playing certain types of audio and static image data.

Conventional systems exist for allowing conventional browsers to play other types of media content, such as real-time audio or video, from the web. There are conventional systems that provide conventional streaming audio or video in real-time. For example, Real Audio and Real Video from Real Networks allows streaming audio or video to be played in real-time on a browser. Streaming video or audio is a mechanism that allows real-time audio or video to be captured, compressed, delivered to a web client via a LAN or the Internet, decompressed and displayed, or played, by the web client. In order to allow streaming video/audio to be provided on the web client, software or plug-ins must be installed for the browser. For example, Real Audio or Real Video can be downloaded and installed by a user. Using Real Audio or Real Video, a conventional browser can play audio or video provided via the Internet or LAN in real-time. The user must, therefore, agree to have the software or plug-in downloaded to the web client and install the software or plug-in so that it can be used with the browser.

Although software or plug-ins allow streaming of video or audio on a conventional browser, one of ordinary skill in the art will readily realize that it would be desirable to provide video or audio in real time on a conventional browser without requiring the installation of software or plug-ins. This functionality would allow a user of the web client to be able to play video and audio provided via the Internet or LAN without expending the time or additional resources required to install and store the additional software of plug-ins. However, as discussed above, a conventional browser is capable of playing only certain types of content, such as static JPEG images. Consequently, without the installed software or plug-ins, a conventional browser cannot stream video/audio in real-time.

Accordingly, what is needed is a system and method for playing media content from a network or the Internet in real-time, for example by streaming audio or video or playing live video or audio. The present invention addresses such a need.

SUMMARY OF THE INVENTION

The present invention provides a method and system for providing media content in real-time on a web client. The web client includes a browser utilizing a cache. The media content can be separated into a plurality of sections. The browser of the web client can read and display a section of the media content without additional software or plug-ins. In one aspect, the method and system comprise ensuring that the web client can flush the cache to allow the media content to be played in real-time, preferably in response to the web client requesting the media content. In this aspect, the method and system also comprise providing the plurality of sections of the media content to the web client section by section and allowing the web client to flush the section of the media content from the cache once each of the plurality of section has been displayed by the browser. In a second aspect, the method and system comprise requesting the media content using the web client and ensuring that the web client can flush the cache to allow the media content to be played in real-time. In this aspect, the method and system also comprise receiving each of the plurality of sections of the media content on the web client section by section, displaying each of the plurality of sections section by section and flushing each section of the media content from the cache once each of the plurality of sections has been displayed.

According to the system and method disclosed herein, the present invention provides a web client with the ability play audio or video in real-time without requiring additional software or plug-ins.

DETAILED DESCRIPTION OF THE INVENTION

Figure 1:
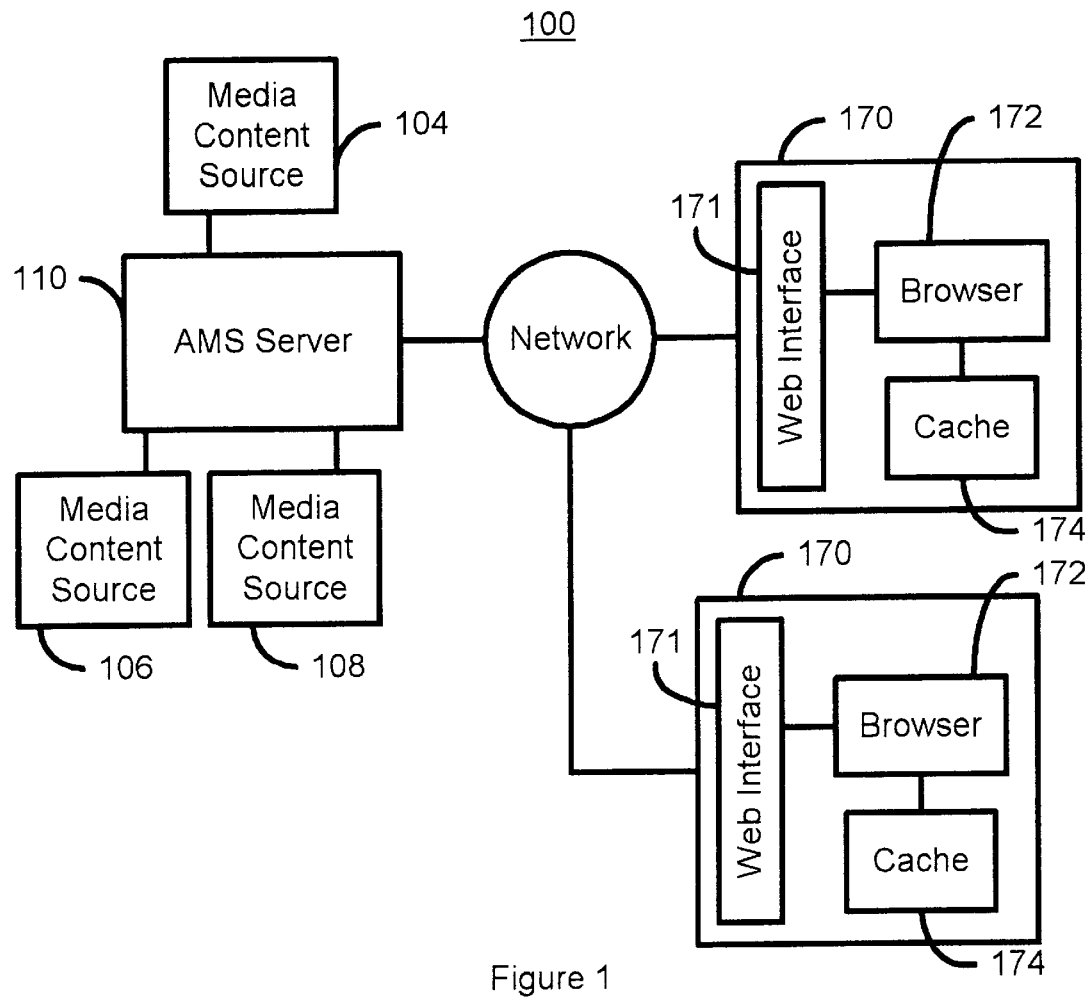
FIG. 1 is a block diagram of one embodiment of a system that allows a browser for a web client to play media content from the Internet or a network in real-time without requiring additional software or plug-ins.

The present invention relates to an improvement in delivery of video to web clients. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Conventional systems exist for allowing a browser of a web client to play media content, such as audio or video, delivered from the Internet or other network. For example, Real Video and Real Audio provided by Real Networks allow streaming of video and audio, respectively, on web clients. Although these systems function, one of ordinary skill in the art will readily realize that these systems require software or plug-ins to be installed in the web client to operate with the browser. Consequently, additional time and resources are expended to install and store the additional software or plug-ins.

The present invention provides a method and system for providing media content in real-time on a web client. The web client includes a browser utilizing a cache. The media content can be separated into a plurality of sections. The browser of the web client can read and display a section of the media content without additional software or plug-ins. In one aspect, the method and system comprise ensuring that the web client can flush the cache to allow the media content to be played in real-time, preferably in response to the web client requesting the media content. In this aspect, the method and system also comprise providing the plurality of sections of the media content to the web client section by section and allowing the web client to flush the section of the media content from the cache once each of the plurality of section has been displayed. In a second aspect, the method and system comprise requesting the media content using the web client and ensuring that the web client can flush the cache to allow the media content to be played in real-time. In this aspect, the method and system also comprise receiving each of the plurality of sections of the media content on the web client section by section, displaying each of the plurality of sections section by section and flushing each section of the media content from the cache once each of the plurality of sections has been displayed by the browser.

The present invention will be described in terms of particular compression standards, such as JPEG, that can be decompressed and played by a browser without the installation of additional software or plug-ins. However, one of ordinary skill in the art will readily recognize that this method and system will operate effectively for other compression standards that can be decompressed and played by a browser without the installation of additional software or plug-ins. The present invention will also be described in the context of particular architectures, particular software, such as JAVA™, and particular browser types. However, one of ordinary skill in the art will readily recognize that the present invention will operate effectively for other architectures, other software and other browser types.

To more particularly illustrate the method and system in accordance with the present invention, refer now to FIG. 1, depicting one embodiment of a system 100 that allows a browser for a web client to play media content from the Internet or a network in real-time without requiring additional software or plug-ins. The system 100 includes an adaptive media streaming (AMS) server 110 in accordance with the present invention, and multiple web clients 170 that are coupled with the AMS server 110 via a network 102. The network 102 could include a local area network (LAN), the Internet, or another type of network. The AMS server 110 is a server appliance that preferably includes or is coupled to a storage (not shown) and/or media content sources 104, 106 and 108. Note that although three media content sources 104, 106 and 108 are shown, nothing prevents the use of another number of media content sources. The storage (not shown) and the media content sources are sources for media content, such as audio and/or video. The AMS server 110 allows the web client 170 to be capable of playing in real time media content that is delivered over the network 102 from the AMS server 110.

The web client 170 is a device that can be coupled to the network 102. For example, the web client 170 may include a cell phone, a personal digital assistant (PDA), a web pad, a personal computer, a laptop computer, or a workstation. The web client 170 includes an interface 171 for coupling the web client 170 to the network 102, a browser 172, a cache 174 used by the browser 172 in displaying data and a process for displaying data on the browser 172. The browser 172 preferably implements a virtual machine, such as a JAVA™ virtual machine. The web client 170 requests media content, such as audio and video, from the AMS server 110. In response, the AMS server 110 provides the media content to the web client 170 in a manner that allows the web client 170 to play the media content in real time without the installation of additional software or plug-ins.

Figure 2A:
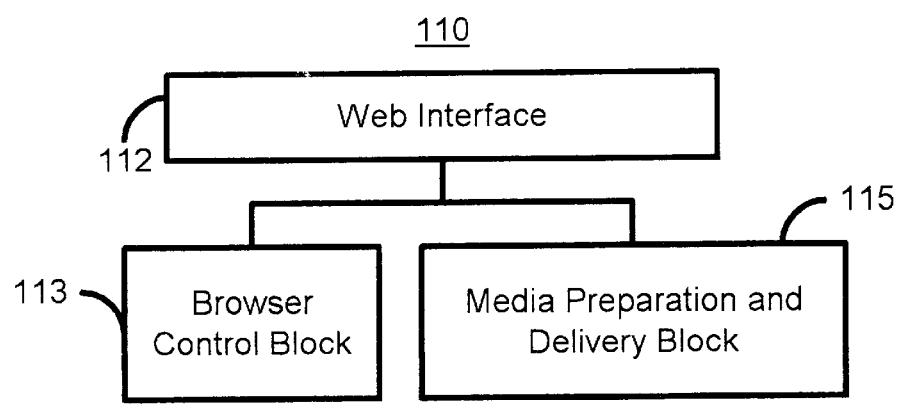
FIG. 2A is a high level block diagram of one embodiment of an adaptive media server for allowing a browser for a web client to play media content from the Internet or a network in real-time without requiring additional software or plug-ins.

FIG. 2A is a more detailed block diagram of one embodiment of the AMS server 110. The AMS server 110 include a web interface 112 for communication via the network 102. The AMS server 110 includes a media preparation and delivery block 115. The media preparation and delivery block 115 aids in preparing the media content and delivering the media content to the network 102 to be provided to the web client 170 depicted in FIG. 1. Referring to FIGS. 1 and 2A, the media preparation and delivery block 115 preferably divides the media content into sections which the browser 172 can display and delivers the media content section by section to the network 102 and, therefore, to the web client 170. For example, in a preferred embodiment, for video, the media preparation and delivery block 115 divides the media content into frames, compresses each frame using a standard such as JPEG, and delivers the video JPEG file (frame or section) by JPEG file (frame or section) to the web client 170. Also in a preferred embodiment, the media preparation and delivery block 115 provides an abort command between each section of the media content. The AMS server 110 also includes a browser control block 214 for ensuring that the browser 172 of the web client 170 is capable of playing media content in real time without requiring the installation of additional software or plug-ins. Referring to FIGS. 1 and 2A, in a preferred embodiment, the browser control block 113 ensures that the web client 170 is capable of flushing sections of media content from the cache 174 such that the media content can to be played in real time. In a preferred embodiment, the browser control block 113 ensures that the browser 172 does not cache data. Thus, when the browser 172 receives an abort command, then receives the next section of data, the browser 172 will not attempt to use data in the cache 174 in displaying the next section of data. In other words, the cache 174 will be flushed between sections of media content provided by the AMS server 110. As a result, the browser 172 will display the media content section by section and flushing the cache between sections, thereby allowing for real-time playing of the media content.

Figure 2B:
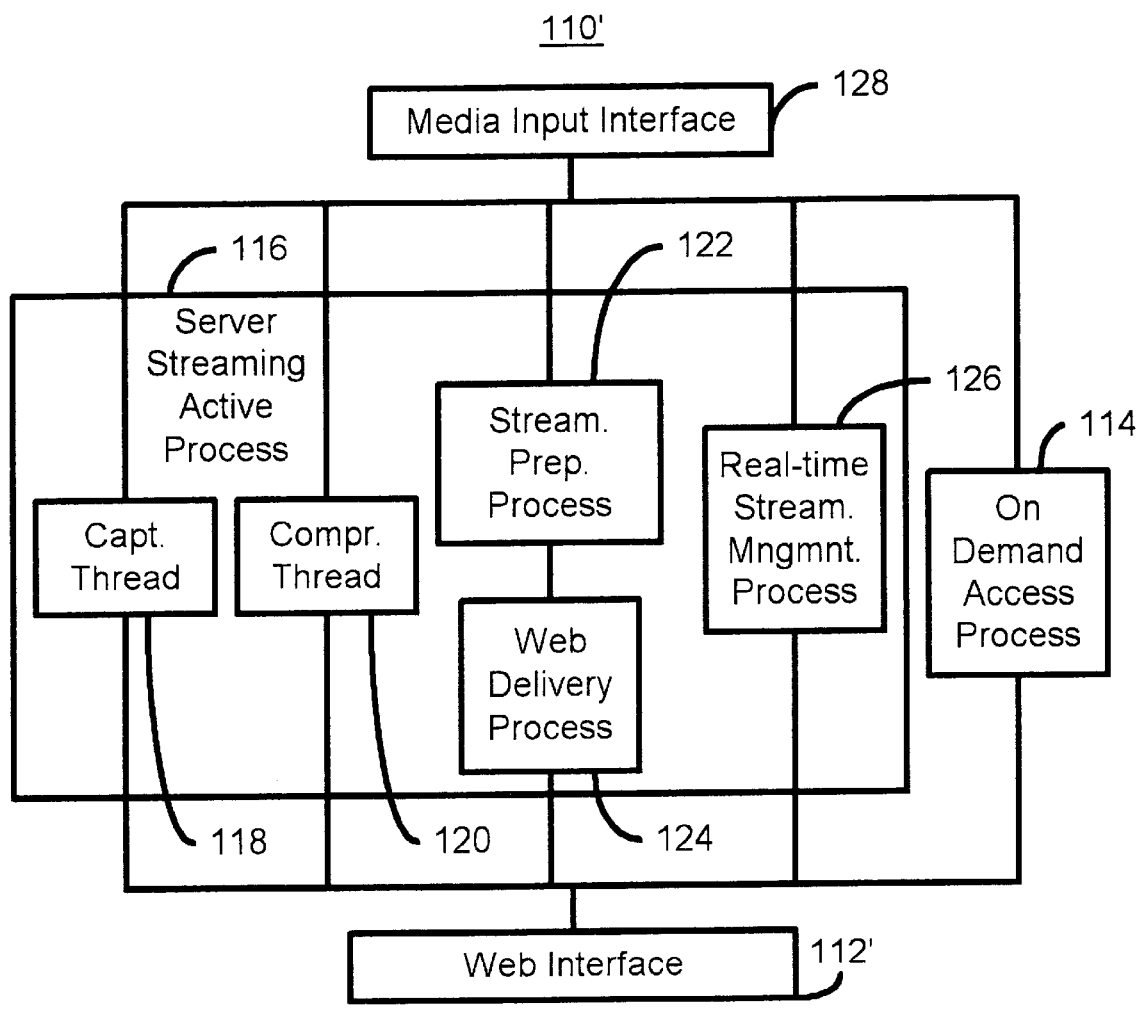
FIG. 2B is a block diagram of one embodiment of an adaptive media server for allowing a browser for a web client to play media content from the Internet or a network in real-time without requiring additional software or plug-ins.

FIG. 2B depicts a more detailed block diagram of one embodiment of the AMS server 110'. The AMS server 110' includes a media input interface 128. The media input interface 128 allows the AMS server 110' to receive media from input sources. For example, the AMS server 110' could receive live video from media content sources 104, 106 and 108 depicted in FIG. 1. Referring to FIGS. 1 and 2B, the AMS server 110 also includes a server streaming active (SSA) process 116. The SSA process 116 handles the streaming of media content, such as video and audio. Thus, portions of the SSA process 116 may be considered to be analogous to the media preparation and delivery block 115 depicted in FIG. 2A. Referring back to FIGS. 1 and 2B, the SSA process includes a capture thread 118, a compression thread 120, a streaming preparation process 122, a web delivery process 224 and a real-time streaming management process 126. The capture thread 118, compression thread 120, streaming thread 122 and web delivery process 224 are active in parallel, but are interlocked so that the sections of the media content for which streaming is performed are in the desired order. Thus a particular portion of the media content is captured, compressed, undergoes streaming, then undergoes delivery in that order. The real-time streaming management process 126 ensures that the remaining processes 118, 120, 122 and 124 can be performed simultaneously and in the proper order.

The AMS server 110' also includes an on demand access process 114. The on demand access process 114 ensures that the SSA process 116 becomes active when the web client 170 requests media content from the AMS server 110'. The on demand access process 114 also ensures that the SSA process 116 remains active throughout delivery of the media content. Moreover, in one embodiment, the one demand access process 114 ensures that the web client 170 can adequately flush the cache 174, as discussed below, so that the browser 170 can play the media content from the AMS server 110' in real-time without the installation of additional software or plug-ins. Thus, a portion of the on demand access process 114 is analogous to the browser control block 113.

Figure 2C:
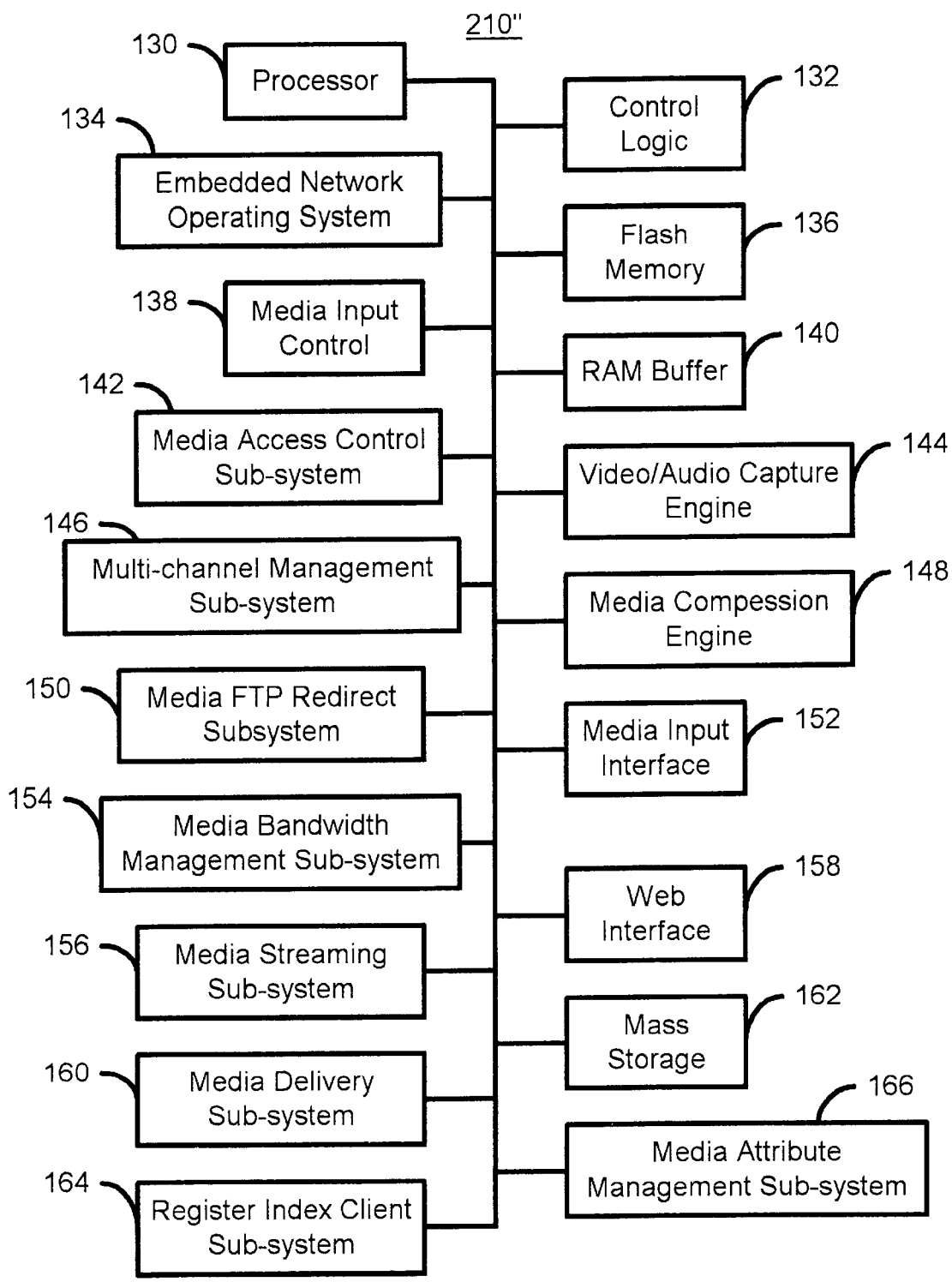
FIG. 2C is a detailed block diagram of one embodiment of an adaptive media server for allowing a browser for a web client to play media content from the Internet or a network in real-time without requiring additional software or plug-ins.

FIG. 2C is a block diagram of another embodiment of an AMS server 110" in accordance with the present invention. The AMS server 110" includes a processor 130, control logic 132, an embedded network operating system 134, a flash memory 136, a media control input 138, a random access memory (RAM) buffer 140, a media access control subsystem 142, a video/audio capture engine 144, a multi-channel management sub-system 146, a media compression engine 148, a media file transfer protocol (FTP) re-direct sub-system 150, a media input interface 152, a media bandwidth management sub-system 154, a media streaming sub-system 156, a web interface 158, a media delivery sub-system 160, an optional mass storage 162, a register index client sub-system 164 and a media attribute management sub-system 166.

The AMS server 110" is preferably capable of substantially the same functions as the AMS servers 110 and 110'. Thus, the AMS server 110" is capable of delivering media content to the web client 170 via the network 102 depicted in FIG. 1. Referring to FIGS. 1 and 2C, the AMS server 110" is capable of controlling the web client 170 so that the web client 170 can flush the cache 174 rapidly enough to allow the media content to be played on the web client 170 in real time. In particular, the AMS server 110" provides the media content to the web client 170 section by section and ensures that the web client 170 is capable of flushing the cache 174 after each section is delivered.

The media content could be stored in the optional mass storage 162 or provided from media sources 104, 106 and 108 via the media input interface 152. The video/audio capture engine 1.44, the media compression engine 148, the media streaming sub-system 156 and the media delivery sub-system 160 handle capture, compression, streaming and delivery for streaming video/audio for the AMS server 110". Preferably, video is compressed frame by frame using JPEG by the media compression engine 148. The register index client subsystem 164 controls registration and tracking of clients that are allowed to obtain media content from the AMS server 110'. The media input control 138 controls the media input devices, such as the media content sources 104, 106 and 108. The media access control sub-system 142 performs administration as well as client authentication and authorization. Thus, access to the media for the AMS server 110" may be controlled by a password or other similar mechanism. The multi-channel management sub-system 146 performs real-time live index menu and channel management. The media FTP re-direct subsystem 150 can re-target or re-direct media to other uniform resource locators (URLs) using FTP. The media bandwidth management subsystem 154 can perform real-time bandwidth detection and adaptive media attribute delivery according to the client bandwidth. Thus, the AMS server 110" can dynamically adapt to the bandwidth of the client 170. The media attribute management sub-system 166 can perform real-time media quality control and media size adjustment automatically for the AMS server 110". In another embodiment, image quality and frame size could be adjusted by an administrator.

The AMS servers 110, 110' and 110" can thus provide media content to the web client 170 on demand and allow the web client 170 to display the media content in real-time without additional software or plug-ins. The AMS servers 110, 110' and 110" can perform media streaming, including capture, compression, streaming and delivery. In addition, if capture and compression functions are not used and media delivered from sources, such as the media content sources 104, 106 and 108 instead of from another source, such as the optional mass storage 162, the AMS servers 110, 110' and 110" simply provide media on demand.

Referring to FIGS. 1, 2A, 2B and 2C, as discussed above, the AMS servers 110, 110' and 110" perform their functions in part by providing the media content section by section to the web client 170. In addition, the AMS servers 110, 110' and 110' control the web client 170 to ensure that the cache 174 can be flushed between each section of the media content played.

Figure 3A:
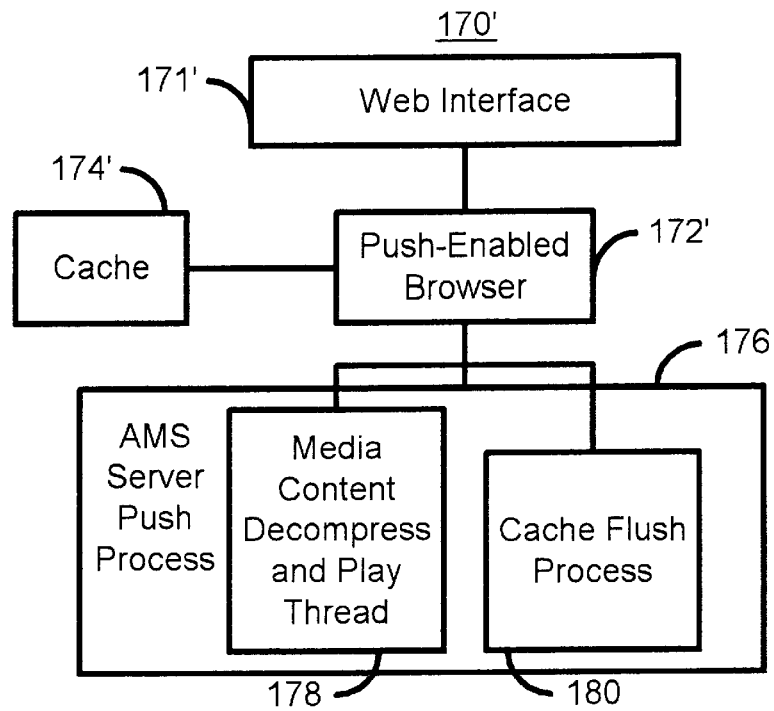
FIG. 3A is a block diagram of one embodiment of a web client that can play media content from the Internet or a network in real-time without requiring additional software or plug-ins.

FIG. 3A depicts one embodiment of a web client 170' in accordance with the present invention. The web client 170' includes a web interface 171' browser 172', a cache 174' and a AMS server push process 176. Referring to FIGS. 1 and 3A, the web interface 171' allows the web client 170' to be coupled with a network 102, which could be the Internet. The cache 174' allows the browser 172' to cache data. The browser 172' is a push-enabled browser. Thus, the browser 172' receives data from the network when the data is pushed from the source to the browser 172'.

The AMS server push process 176 aids in allowing the push-enabled browser 172' to play media content in real time without additional software or plug-ins being installed. The AMS server push process 176 includes a media content decompress and play thread 178 and a cache flush thread 180. The media content decompress and play thread 178 decompresses and plays a section of the media content pushed to the web client 170' by the AMS server 110, 110' and 110". The media content is broken into sections by the AMS server 110, 110'or 110" as discussed below. The cache flush thread 180 flushes the cache 174'. In particular, the web client 170' receives a section of media content from the AMS server 110, 110' or 110". The web client 170' decompresses and plays the section on the browser 172' using the media content decompress and play thread 178. However, as discussed above, the section provided by the AMS server 110, 100' and 110" can be decompressed and played by a conventional browser. For example, the section may be a frame of video data compressed using JPEG. The cache flush thread 180 flushes the cache 174' after each section is played by the push-enabled browser 172'. Thus, the browser 172' plays a section, the cache 174' is flushed, the browser 172' plays the next section, and so on. The cache flush thread 180 and media content decompress and play thread 178 function in this manner because of information provided by the AMS server 110, 110' or 110", as discussed below.

Figure 3B:
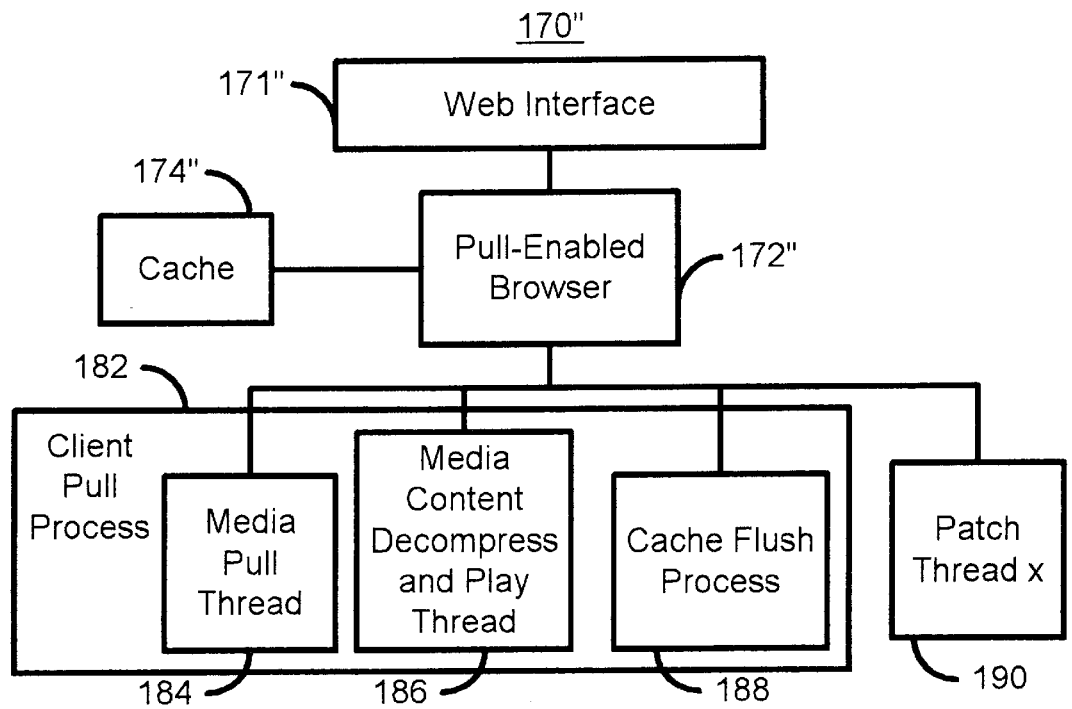
FIG. 3B is a block diagram of another embodiment of a web client that can play media content from the Internet or a network in real-time without requiring additional software or plug-ins.

FIG. 3B depicts another embodiment of a web client 170" in accordance with the present invention. The web client 170" includes a web interface 171", a browser 172", a cache 174", a client pull process 182 and a patch thread x 190. Referring to FIGS. 1 and 3B, the web interface 171" allows the web client 170" to be coupled with a network 102, which could be the Internet. The cache 174" allows the browser 172" to cache data. The browser 172" is a pull-enabled browser. Thus, the browser 172" receives data from the network when the data is pulled by the web client 170" from the source to the browser 172".

The client pull process 182 aids in allowing the pull-enabled browser 172" to play media content in real time without additional software or plug-ins being installed. The client pull process 182 includes a media pull thread 184, media content decompress and play thread 186 and a cache flush thread 188. The media pull thread 184 pulls sections of the media content from the AMS sever 110, 110' and 110". The media data pulled by the media thread 184 is broken into sections by the AMS server 110, 110' and 110" as discussed below. The media content decompress and play thread 186 decompresses and plays the media content pulled by the web client 170" from AMS server 110, 110' and 110". The cache flush thread 188 flushes the cache 174". In particular, the web client 170" pulls a section of media content from the AMS server 110, 110' or 110" using the pull thread 184. The web client 170" decompresses and plays the section using the media content decompress and play thread 186. However, as discussed above, the section provided by the AMS server 110, 106' and 110" can be decompressed and played by a conventional browser. For example, the section may be a frame of video data compressed using JPEG. The cache flush thread 188 flushes the cache 174" after each section is played by the pull-enabled browser 172". Thus, the client pull process 182 pulls the section, the video/audio thread 184 decompresses the section and plays the section on the browser 172", the cache 174" is flushed, the client pull process 182 pulls the next section, and so on. The cache flush thread 188 and media content decompress and play thread 186 function in this manner because of information provided by the AMS server 110, 110' or 110", as discussed below, and because of the patch thread x 190.

In order to properly flush the cache 174", the patch thread x 190 is used in the pull-enabled browser 172". The patch thread x 190 is provided by the AMS server 110, 110' or 110" without requiring installation of additional software or plug-ins. The pull-enabled browser 172" generally includes a JAVA™ virtual machine. The release of resources, for example of the flushed cache 174", is typically accomplished using a low priority background thread. However, the media content decompress and play thread 186 has a high priority. Thus, without the patch thread x 190, the resources will not be able to be released by low priority threads to after the cache 174" is flushed. In other words, the priority of the media content decompress and play thread 186 may not allow low priority threads to be serviced. Consequently, the web client 170" may crash. The patch thread x 190 allows the low priority threads to be serviced, as discussed below. In particular, the patch thread x 190 allows the media content decompress and play thread 186 to be interleaved with the lower priority threads. Thus, the cache 174" can be flushed between sections of media content, as discussed below, and resources released without crashing the web client 170".

Figure 4A:
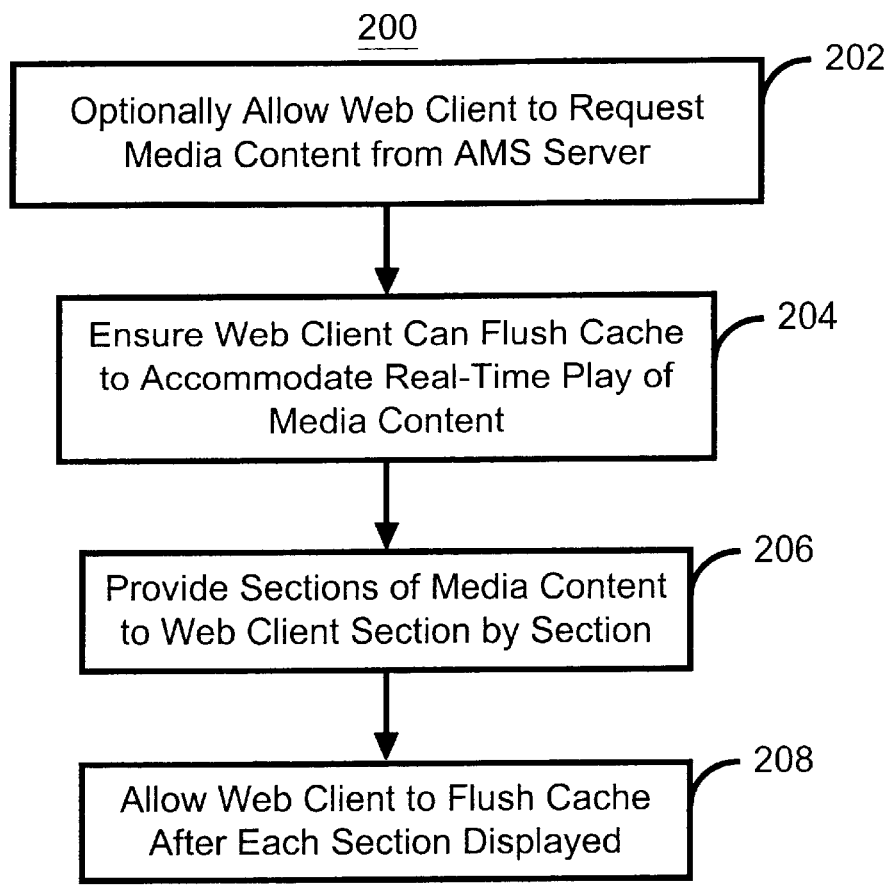
FIG. 4A is a high-level flow chart of one embodiment of a method for allowing a browser of a web client to can play media content from the Internet or a network in real-time without requiring additional software or plug-ins.

FIG. 4A depicts one embodiment of a method 200 for allowing a web client to play media content in real time without the installation of additional software. The method 200 can be used with the AMS servers 110, 110' and 110" and the web clients 170, 170' and 170". In addition, the method 200 could be used with other systems (not shown). For clarity, however, the method 100 will be described using the AMS server 110 and the web client 170.

Referring to FIGS. 1 and 4A, the web client 170 is preferably allowed to request media content from the AMS server 110, via step 202. Thus, in one embodiment, the web client 170 demands media content from the AMS server 110 via the network 102. Thus, bandwidth for the web client 170 is saved by providing media content to the web client 170 only in response to a demand by the web client 170. The media content is preferably video or audio. However, in another embodiment, the method 200 could commence with step 204, discussed below, without waiting for a demand from the web client 170. The AMS server 110 ensures that the web client 170 can flush the cache 174 such that real-time play of the media content can be achieved, via step 204. In one embodiment, step 204 includes indicating to the browser 172 that the sections, discussed below, have a size greater than the actual size of the sections. In one embodiment, step 204 also includes ensuring that the cache 170 can be flushed in real time after each section is displayed.

The AMS server 110 provides sections of the media content section by section to the web client 170, via step 206. Thus, the AMS server 110 preferably breaks the media content into sections, prepares the sections for delivery to the web client 170 and delivers the sections to the web client 170 through the network 102 in order. The sections are such that the browser 170 can display each section without requiring the installation of additional software or plug-ins. In one embodiment, step 206 includes capture, compression, streaming and delivery of the media content. For video content, step 206 preferably separates the video into frames and compresses the frames using JPEG. Thus, each section is a JPEG compressed framed.

The web client 170 is allowed to flush sections from the cache after each section is played, via step 208. Thus, using the method 200, the media content is provided to the web client by sections. The browser can then display each section of media content and the cache can be flushed after the section is displayed. The browser is capable of displaying each section of media content without the installation of additional software or plug-ins. Thus, using the method 200, a section is provided to the web client 170. The section is then displayed by the browser 172. In one embodiment, the section is both decompressed and displayed. The web client 170 can also flush the cache 174 between display of sections. Thus, the web client 170 is tricked into behaving as though media content is not being delivered and displayed in real time. Instead, the web client 170 and the browser 172 behave as though only a section of the media content is being displayed. In one embodiment, where the web client 170 is informed that the size of the section is greater than the actual size of the section, the web client 170 behaves as though the browser 172 is displaying the same section repeatedly. In addition, the cache is flushed between sections to ensure that a different section is displayed by the browser 172 each time. Thus, the web client is able to play the media content provided over the network 102 without the installation of additional software or plug-ins.

Figure 4B:
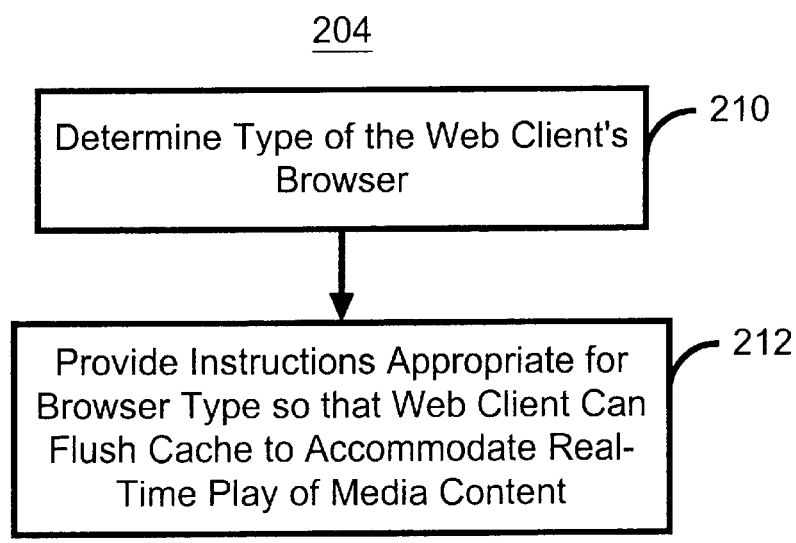
FIG. 4B is a flow chart of one embodiment of a method for ensuring that a browser of a web client can adequately flush the cache.

In one embodiment of the method 200, the step 204, ensuring that the web client 170 can flush the cache such that the media content can be played in real time, depends upon the type of browser 172 used. FIG. 4B depicts the step 204 in such an embodiment of the method 200. FIG. 4B will also be described using FIG. 1. The type of the browser 170 is determined by the AMS server 110, via step 210. In one embodiment, step 210 includes receiving information from the web client 170 and determining, based on the information, the type of the browser 170. In another embodiment, this determination can be made using the information in the web client's request for media content in step 102 of the method 100 of FIG. 4A. Referring back to FIG. 4B, the AMS server 110 then provides the web client 170 with instructions which are appropriate for the type of browser 172, via step 212. The instructions allow the web client 170 to flush the cache 174 between sections of the media content.

Figure 5A:
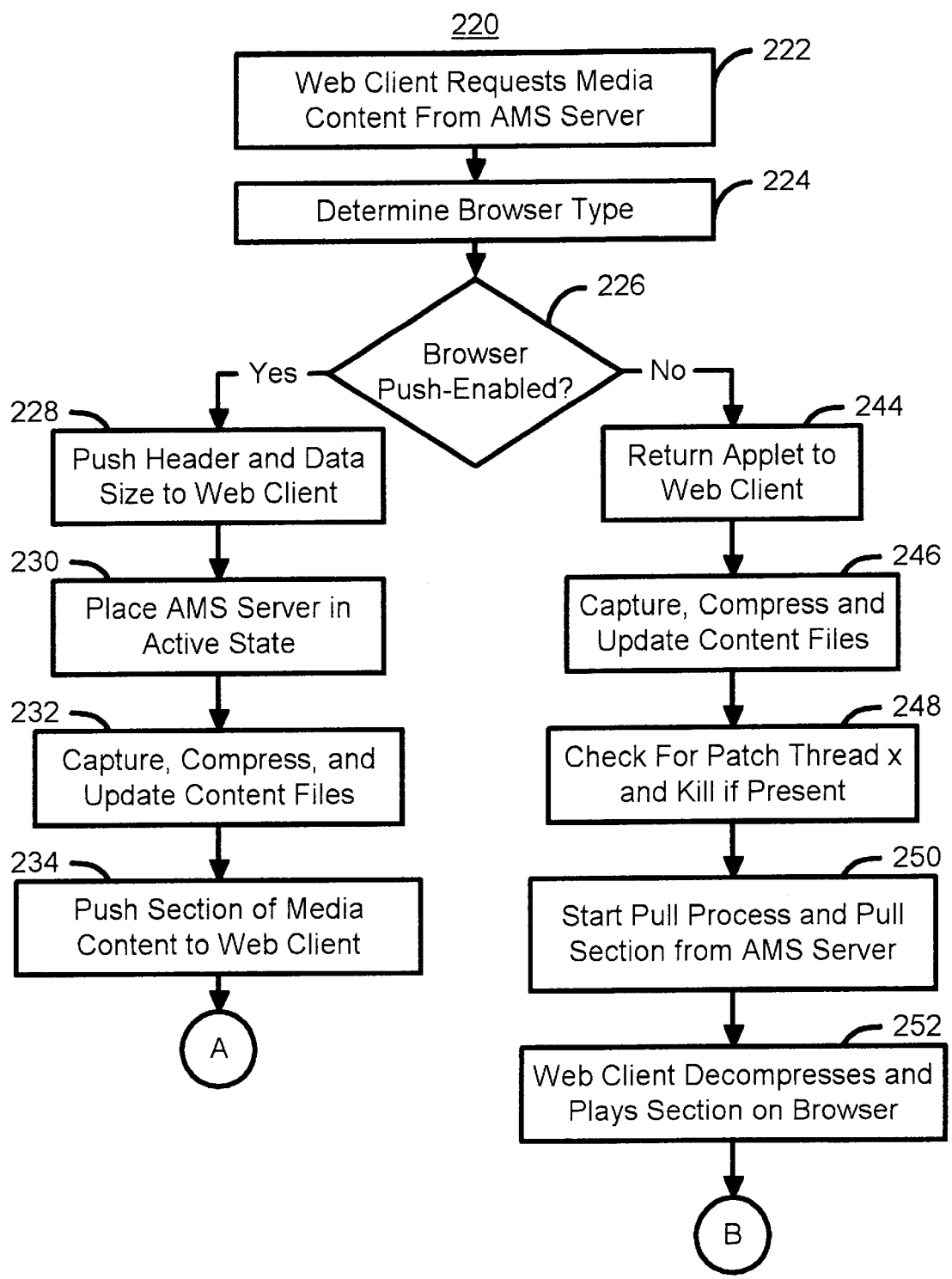
FIGS. 5A and 5B depict a more detailed flow chart of a preferred embodiment of a method for allowing a browser of a web client to can play media content from the Internet or a network in real-time without requiring additional software or plug-ins.
Figure 5B:
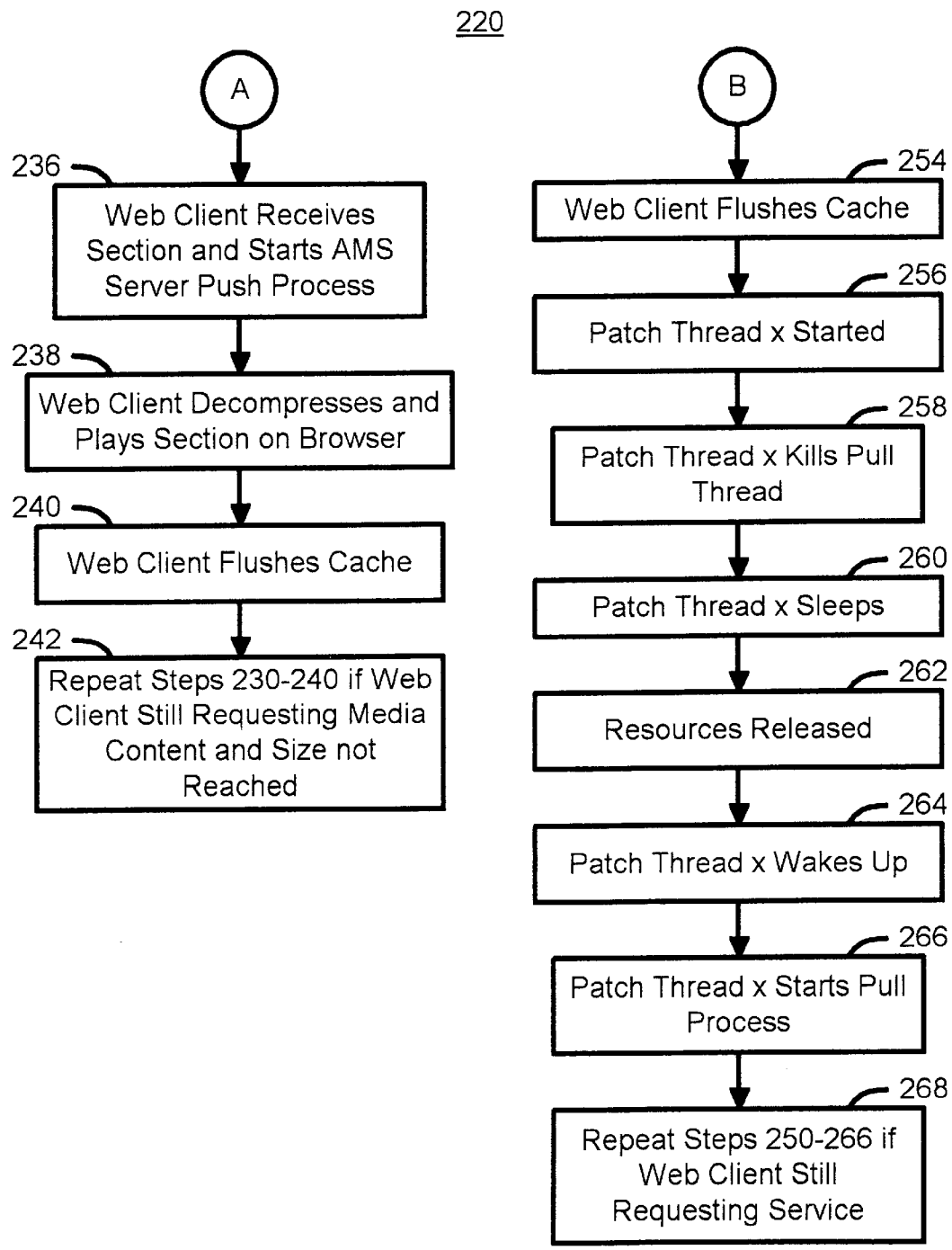

FIGS. 5A and 5B depict a preferred embodiment of a method 220 for allowing a web client to play media content in real time without the installation of additional software. For clarity, the method 220 will be described using the system 100 depicted in FIG. 1. However, the method 220 can be used with the AMS servers 110, 110' and 110" as well as the clients 170, 170' and 170". In addition, the method 220 could be used with other systems (not shown).

Referring to FIGS. 5A, 5B and 1, the web client 170 requests media content from the AMS server 110, via step 222. In a preferred embodiment, step 222 is performed when the web client 170 sends a demand for media content to the AMS server 110 over the network 102. Thus, bandwidth for the web client 170 is saved by providing media content to the web client 170 only in response to a demand by the web client 170. It is then determined what type of browser 172 is used by the web client 170, via step 224. In a preferred embodiment, step 224 includes determining whether the browser 172 is a push-enabled browser or a pull-enabled browser based on information provided in the request made in step 222. It is then determined whether the browser 172 is a push-enabled browser, via step 226.

If the browser is a push enabled browser, then the AMS server 110 pushes a header to the web client 170 and indicates to the web client the size of the sections of the media content, via step 228. In a preferred embodiment, the size of the sections and the header are separately provided to the web client. The header is preferably a common gateway interface (CGI) header and is preferably a streaming header which prepares the web client 170 for streaming of the media content. The header preferably instructs the web client 170 not to cache the media content provided by the AMS server 110. Thus, the cache 174 may be flushed between sections of media content, allowing the media content to be played in real time. The size provided to the web client in step 228 is larger than the actual size of the sections of media content. The reason for this is described below.

It is also ensured that the AMS server 110 remains in the active state for providing media content, via step 230. In one embodiment, step 230 ensures that the media preparation and delivery block 115, or the SSA process 116, remains active throughout the time the media content is being provided to the web client 170. Thus, the AMS server 110 will continue to provide its functions related to the media content throughout the time that the media content is being provided to the web client 170. For example, if the AMS server 110 provides streaming media to the web client 170, then step 230 ensures that the AMS server 110 can continue to perform capture, compression, streaming and delivery until the media content has been provided to the web client 170.

If media streaming is to be performed, then the AMS server 110 captures the media content input, compresses the media content and updates content data files, via step 232. Step 232 performs these functions for the media content section by section. As a result, a particular file includes a section of media content that has been compressed. Step 232 also ensures that that the capture, compression and updating functions are interleaved and interlocked so that sections of the media content are captured, compressed and have their data files updated rapidly and in the proper order. If, however, streaming of the media content is not to be performed, then step 232 may include receiving the media content from media sources to allow media on demand to be provided by the AMS server 110.

The AMS server 110 then pushes a section of media content that has been compressed to the web client, via step 234. The section of media content is preferably in a standard file, such as a JPEG file and/or a standard web audio file. Thus, the browser 172 of the web client 170 should be able to play the section of media content pushed in step 234 without the requiring the installation of additional software or plug-ins.

The web client receives the section of media content and preferably commences the AMS server push process 176 depicted in FIG. 3A, via step 236. The web client 170 decompresses and plays the media content on the browser 172, via step 238. Step 238 is preferably performed using the AMS server push process 176 depicted in FIG. 3A. However, as discussed above, the section of media content can be decompressed and played on the browser 172 without requiring the installation of additional software or plug-ins. The web client 170 then flushes the cache 174, via step 240. Steps 230 through 240 are then repeated if the web client 170 continues to request the media content and the size of the section provided in step 228 is not met, via step 242. The size of the section is typically not met because the actual size of the section is preferably smaller than the size of the section provided to the web client 170 in step 228. Thus, the web client 170 considers the section of media content pushed to the web client 170 in 234 to be incomplete and continues to request the media content. After the section is displayed in step 238, the cache 174 is flushed in step 240. The next section of media content can then be pushed to the web client 170. The next section will be displayed on the browser 170 without remnants of the previous section because the cache had been flushed. This process of displaying sections of the media content and flushing the cache may continue until the desired media content has been displayed on the push-enabled browser.

If it is determined in step 226 that the browser 170 is not a push-enabled browser, then the browser 170 is a pull-enabled browser, such as the browser 172" depicted in FIG. 3B. Referring back to FIGS. 5A, 5B and 1, in such an event, the AMS server 110 provides an applet to the web client 170, via step 244. The applet is preferably a JAVA™ applet. The applet preferably includes the patch thread x 190 depicted in FIG. 3B, which allows the web client 170 to flush the cache 174. Also in a preferred embodiment, the applet provides the web client 170 with a size of a section of media content. However, as discussed above, the actual size of the section of media content is preferably smaller than the size provided to the web client 170.

The AMS server 110 captures and compresses the media content and updates content files, via step 246. Step 246 performs these functions for the media content section by section. As a result, a particular file includes a section of media content that has been compressed. Step 246 also ensures that that the capture, compression and updating functions are interleaved and interlocked so that sections of the media content are captured, compressed and have their data files updated rapidly and in the proper order. If, however, streaming of the media content is not to be performed, then step 246 may include receiving the media content from media sources to allow media on demand to be provided by the AMS server 110.

The web client 170 then checks to determine whether the patch thread x 190 already exists on the web client 170 and if so, kills the patch thread x 190, via step 248. The web client 170 preferably commences the client pull process 182 depicted in FIG. 3B and pulls a section of media content from the AMS server 110, via step 250. Note that commencing the pull process and pulling a section of the media content may also be considered to be two separate steps. The section of media content pulled is preferably in a standard file, such as a JPEG file and/or a standard web audio file. Thus, the browser 172 of the web client 170 should be able to play the section of media content pushed in step 234 without the requiring the installation of additional software or plug-ins.

The web client receives the section of media content, decompresses and plays the media content on the browser 172, via step 252. Step 252 is preferably performed using the client pull process 182 depicted in FIG. 3B. However, as discussed above, the section of media content can be decompressed and played on the browser 172 without requiring the installation of additional software or plug-ins. The web client 170 then flushes the cache 174, via Step 254.

The web client then starts the patch thread x 190, via step 256. The patch thread x 190 then kills the client pull process 182, via step 258. Killing the client pull process 182 allows lower priority threads for the web client 170 to be serviced and, therefore, the appropriate resources to be released. Consequently, the patch thread x 190 sleeps for an interval and the resources are released, via steps 260 and 262, respectively. The patch thread x 190 then wakes up and starts the client pull process 182, via steps 264 and 266, respectively. A JAVA™ virtual machine is preferably incorporated into the browser 172. As discussed above, the patch thread x is used for JAVA™ virtual machines to allow the lower priority threads to be interleaved with the higher priority client pull process 182 and the appropriate resources released. Consequently, steps 256 through 266 allow flushing of the cache 174 without crashing of the web client 170.

Steps 250 through 266 are then repeated if the web client 170 continues to request the media content, via step 268. The size of the section is typically not met because the actual size of the section is preferably smaller than the size of the section provided to the web client 170 in step 244. Thus, the web client 170 considers the section of media content pulled by the web client 170 to be incomplete and continues to request the media content. This process of displaying sections of the media content, flushing the cache, and releasing of resources may continue until the desired media content has been displayed on the push-enabled browser.

Using the method 220, therefore, a push-enabled browser, such as the browser 172' depicted in FIG. 3A, and a pull-enabled browser, such as the browser 172" depicted in FIG. 3B, can be provided with media content via the network 102. Note that instead of using the same AMS server 110, 110' or 110" for both browsers 172' and 172", one of the browsers 172' and 172" could be directed to another AMS server (not shown). In such an embodiment, particular AMS servers could be used only for one type of browser, while other AMS servers could be used only for another type of browser. However, the method 220 allows the same AMS server 110, 110' and 110" to be used for different types of browsers.

Thus, the system 100, the AMS servers 110, 110' and 110", the web clients 170, 170' and 170" and the methods 200 and 220 allow media content to be provided to the web clients 170, 170' and 170" over the network 102 and played in real time without requiring additional software or plug-ins. Because additional software or plug-ins need not be installed, media content can be played on any web client 170, 170' or 170", rather than only those having sufficient resources for the software or plug-ins. For example, media content could be provided to and played on cell phones PDAs, web pads, and thin clients. Thus, fewer resources of a particular web client 170, 170' or 170" are consumed. In addition, the possibility of additional security breaches for web clients 170, 170' and 170" due to the installation of additional software or plug-ins are avoided. In some embodiments, the delivery of media content can be dynamically updated in response to the available bandwidth for a web client 170, 170' and 170". In addition, the AMS server 110, 110' and 110" may be scalable. Additional sources of media content, such as the media content sources 104, 106 and 108, may be coupled with a particular AMS server 110, 110' and 110" or AMS servers 110, 110' and 110" may be coupled together in order to provide more media content or service more web clients 170, 170' and 170", respectively. Furthermore, a particular AMS server 110, 110' and 110" may be relatively simple to implement. Consequently, the system 100, the AMS servers 110, 110' and 110", the web clients 170, 170' and 170" and the methods 200 and 220 provide many advantages Over conventional systems for providing media content to and playing media content on a web client.

A method and system has been disclosed for providing media content via a network, such as the Internet or a LAN, to a browser in a web client in real-time without requiring installation of additional software or plug-ins. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing media content in real-time on a web client including a browser utilizing a cache, the media content capable of being separated into a plurality of sections having a first size, the method comprising:
   (a) ensuring that the web client is capable of flushing the cache to allow the media content to be played in real-time;
   (b) providing the plurality of sections of the media content to the web client section by section over a network; and
   (c) allowing the web client to flush each section of the media content from the cache in real time once each of the plurality of sections has been displayed;
   wherein the browser of the web client is capable of reading and displaying the section of the media content without additional software or plug-ins;
   wherein the ensuring step (a) further indicates that each of the plurality of sections has a second size greater than the first size if the browser is a push-enabled browser.

2. The method of claim 1 further comprising the step of:
   (d) allowing the web client to request the media content before the ensuring step (a).

3. The method of claim 1 wherein the browser has a type and wherein the ensuring step (a) further includes the steps of:
   (a1) determining the type of the browser; and
   (a2) providing the browser with instructions specific to the type of the browser that allow the web client to flush the cache to allow the media content to be played in real-time.

4. The method of claim 3 wherein the type determining step (a1) includes the step of:
   (a1i) determining whether the browser is the push-enabled browser or a pull-enabled browser.

5. The method of claim 1 wherein the plurality of sections providing step (b) further includes the step of:
   (b1) providing each of the plurality of sections to the web client, each of the plurality of sections being followed by an abort command.

6. The method of claim 1 wherein the plurality of sections providing step (b) further includes the steps of:
   (b1) capturing the media content;
   (b2) compressing the media content to provide the plurality of sections;
   (b3) streaming the plurality of sections; and
   (b4) delivering each of the plurality of sections, each of the plurality of sections being followed by an abort command.

7. The method of claim 1 wherein the media content includes video data and wherein each of the plurality of sections includes a JPEG frame of video data.

8. The method of claim 1 wherein the media content includes audio data.

9. The method of claim 1 wherein the plurality of sections providing step (b) further includes the step of:
   (b1) adjusting a rate at which the plurality of sections is sent to account for a bandwidth of the web client.

10. The method of claim 1 wherein the ensuring step (a) further indicates that each of the plurality of sections has the second size for a pull-enabled browser.

11. A method for providing media content in real-time on a web client including a browser utilizing a cache, the media content capable of being separated into a plurality of sections, the browser having a type, the method comprising:
   (a) ensuring that the web client is capable of flushing the cache to allow the media content to be played in real-time, wherein the ensuring step (a) further includes the steps of:
      (a1) determining the type of the browser;
         wherein the type determining step (a1) includes the step of:
            (a1i) determining whether the browser is the push-enabled browser or a pull-enabled browser; and
      (a2) providing the browser with instructions specific to the type of the browser that allow the web client to flush the cache to allow the media content to be played in real-time;
         wherein the section has a first size and wherein the instruction providing step (a2) further includes the steps of:
            (a2i) indicating to the web client that the browser is not to cache data if the browser is a push-enabled browser;
            (a2ii) indicating to the web client that the section has a second size greater than the first size if the browser is a push-enabled browser;
            (a2iii) providing an applet to the web client if the browser is a pull-enabled browser, the applet including a patch thread that allows the web client to flush the cache without crashing the web client;
   (b) providing the plurality of sections of the media content to the web client section by section over a network; and
   (c) allowing the web client to flush each section of the media content from the cache in real time once each of the plurality of sections has been displayed;
      wherein the browser of the web client is capable of reading and displaying the section of the media content without additional software or plug-ins.

12. The method of claim 11 wherein the plurality of sections providing step (b) further includes the steps of:
   (b1) pushing each of the plurality of sections to the web client if the browser is the push-enabled browser, each of the plurality of sections being flowed by an abort command;
   (b2) allowing the web browser to pull each of the plurality of sections section by section if the browser is a pull-enabled browser.

13. A method for providing media content in real-time on a web client including a browser utilizing a cache, the media content capable of being separated into a plurality of sections having a first size, the browser of the web client capable of reading and displaying the section of the media content without additional software of plug-ins, the method comprising:

(a) requesting the media content using the web client;
(b) ensuring that the web client is capable of flushing the cache to allow the media content to be played in real-time;
(c) receiving each of the plurality of sections of the media content on the web client section by section over a network;
(d) displaying each of the plurality of sections section by section; and
(e) flushing each section of the media content from the cache once each of the plurality of sections has been played;
  wherein the ensuring step (b) further indicates that each of the plurality of sections has a second size greater than the first size if the browser is a push-enabled browser.

14. The method of claim 13 wherein the browser has a type and wherein the ensuring step (b) further includes the steps of:
  (b1) providing information which allows the type of the browser to be determined; and
  (b2) receiving instructions specific to the type of the browser that allow the web client to flush the cache to allow the media content to be played in real-time.

15. The method of claim 14 wherein the type of the browser includes the push-enabled browser or a pull-enabled browser.

16. The method of claim 13 wherein the ensuring step (b) further indicates that each of the plurality of sections has the second size for a pull-enabled browser.

17. A method for providing media content in real-time on a web client including a browser utilizing a cache, the media content capable of being separated into a plurality of sections the browser of the web client capable of reading and displaying the section of the media content without additional software of plug-ins, the method comprising:
  (a) requesting the media content using the web client;
  (b) ensuring that the web client is capable of flushing the cache to allow the media content to be played in real-time;
    wherein the browser has a type and wherein the ensuring step (b) further includes the steps of:
    (b1) providing information which allows the type of the browser to be determined; and
    (b2) receiving instructions specific to the type of the browser that allow the web client to flush the cache to allow the media content to be played in real-time;
      wherein the section has a first size and wherein the instruction receiving step (b2) further includes the steps of:
      (b2i) receiving information in the web client that indicates the browser is not to cache data and receiving a second size for the section, the second size being greater than the first size if browser is a push-enabled browser;
      (b2ii) receiving an applet in the web client if the browser is a pull-enabled browser, the applet including a patch thread that allows the web client to flush the cache without crashing the web client;
  (c) receiving each of the plurality of sections of the media content on the web client section by section over a network;
  (d) displaying each of the plurality of sections section by section; and
  (e) flushing each section of the media content from the cache once each of the plurality of sections has been played.

18. The method of claim 17 wherein the plurality of sections receiving step (c) further includes the steps of:
  (c1) receiving each of the plurality of sections to the web client pushed to the web client if the browser is a push-enabled browser, each of the plurality of sections being followed by an abort command;
  (c2) pulling each of the plurality of sections section by section if the browser is a pull-enabled browser.

19. An adaptive media streaming (AMS) server for providing content in real-time on a web client including a browser utilizing a cache, the media content capable of being separated into a plurality of sections, the browser of the web client capable of reading and displaying the section of the media content without additional software or plug-ins, a first size being defined for the section, the AMS server comprising:
  means for ensuring that the web client is capable of flushing the cache to allow the media content to be played in real-time; and
  means for providing the plurality of sections of the media content to the web client section by section over a network;
  wherein the web client is allowed to flush the section of the media content from the cache once each of the plurality of sections has been displayed;
  wherein the ensuring means further indicates that each of the plurality of sections has a second size greater than the first size if the browser is a push-enabled browser.

20. The AMS server of claim 19 further comprising:
  an interface for receiving a request for the media content from the web client.

21. The AMS server of claim 19 wherein the browser has a type and wherein the ensuring means further includes:
  means for determining the type of the browser; and
  means for providing the browser with instructions specific to the type of the browser that allow the web client to flush the cache to allow the media content to be played in real-time.

22. The AMS server of claim 21 wherein the type determining means determine whether the browser is the push-enabled browser or a pull-enabled browser.

23. The AMS server of claim 19 wherein the plurality of sections providing means further provide each of the plurality of sections separated by an abort command to the web client.

24. The AMS server of claim 19 wherein the plurality of sections providing means further includes:
  a video/audio capture engine for capturing the media content;
  a media compression engine for compressing the media content to provide the plurality of sections;
  a media streaming sub-system for streaming the plurality of sections; and
  a media delivery sub-system for delivering each of the plurality of sections, each of the plurality of sections being followed by an abort command.

25. The AMS server of claim 19 wherein the media content includes video data and wherein each of the plurality of sections includes a JPEG frame of video data.

26. The AMS server of claim 19 wherein the media content includes audio data.

27. The AMS server of claim 19 wherein the plurality of sections providing means further adjust a rate at which the plurality of sections are sent to account for a bandwidth of the web client.

28. The AMS server of claim 19 wherein the ensuring means further indicates that each of the plurality of section has the second size for a pull-enabled browser.

29. An adaptive media streaming (AMS) server for providing content in real-time on a web client including a browser utilizing a cache, the media content capable of being separated into a plurality of sections, the browser of the web client capable of reading and displaying the section of the media content without additional software or plug-ins, the AMS server comprising:

means for ensuring that the web client is capable of flushing the cache to allow the media content to be played in real-time, wherein the browser has a type and wherein the ensuring means further includes:

means for determining the type of the browser; and means for providing the browser with instructions specific to the type of the browser that allow the web client to flush the cache to allow the media content to be played in real-time; and means for providing the plurality of sections of the media content to the web client section by section over a network;

an interface for receiving a request for the media content from the web client;

wherein the web client is allowed to flush the section of the media content from the cache once each of the plurality of sections has been displayed wherein the section has a first size and wherein the instruction providing means further indicate to the web client that the browser is not to cache data if the browser is a push-enabled browser, indicate to the web client that the section has a second size greater than the first size if the browser is a push-enabled browser, and provide an applet to the web client if the browser is a pull-enabled browser, the applet including a patch thread that allows the web client to flush the cache without crashing the web client;

wherein the type determining means determine whether the browser is a push-enabled browser or a pull-enabled browser.

30. The AMS server of claim 29 wherein the plurality of sections providing means further include means for pushing each of the plurality of sections to the web client if the browser is a push-enabled browser, each of the plurality of sections being followed by an abort command; and means for allowing the web browser to pull each of the plurality of sections section by section if the browser is a pull-enabled browser.

31. A web client capable of playing media content in real-time, the media content capable of being separated into a plurality of sections having a first size, comprising:

a cache;

a web interface to allow for requesting the media content and receiving the plurality of sections of the media content section by section over a network;

a browser utilizing a cache, the browser of the web client capable of reading and displaying each of the plurality of sections of the media content without additional software or plug-ins;

means for ensuring that the web client is capable of flushing the cache to allow the media content to be played in real-time, thereby allowing each of the plurality of sections of the media content to be flushed from the cache once each of the plurality of sections has been displayed;

wherein the ensuring means further indicates that each of the plurality of sections has a second size greater than the first size if the browser is a push-enabled browser.

32. The web client of claim 31 wherein the browser has a type and wherein the ensuring means further provide information which allows the type of the browser to be determined and receive instructions specific to the type of the browser that allow the web client to flush the cache to allow the media content to be played in real-time.

33. The web client of claim 32 wherein the type of browser includes the push-enabled browser or a pull-enabled browser.

34. The web client of claim 31 wherein the ensuring means further indicates that each of the plurality of sections has the second size for a pull-enabled browser.

35. A web client capable of playing media content in real-time, the media content capable of being separated into a plurality of sections having a first size, comprising:

a cache;

a web interface to allow for requesting the media content and receiving the plurality of sections of the media content section by section over a network;

a browser utilizing a cache, the browser of the web client capable of reading and displaying each of the plurality of sections of the media content without additional software or plug-ins;

means for ensuring that the web client is capable of flushing the cache to allow the media content to be played in real-time, thereby allowing each of the plurality of sections of the media content to be flushed from the cache once each of the plurality of sections has been displayed wherein the browser has a type and wherein the ensuring means further provide information which allows the type of the browser to be determined and receive instructions specific to the type of the browser that allow the web client to flush the cache to allow the media content to be played in real-time wherein the type of browser includes a push-enabled browser or a pull-enabled browser;

wherein the section has a first size and wherein the ensuring means further receive information in the web client that indicate the browser is not to cache data and receiving a second size for the section, the second size being greater than the first size if the browser is a push-enabled browser and receive an applet in the web client if the browser is a pull-enabled browser, the applet including a patch thread that allows the web client to flush the cache without crashing the browser.

36. The web client of claim 35 wherein the plurality of sections receiving means further includes:

means for receiving each of the plurality of sections to the web client pushed to the web client if the browser is a push-enabled browser, each of the plurality of sections being followed by an abort command; or means for pulling each o the plurality of sections section by section if the browser is a pull-enabled browser.

37. A computer-readable medium containing a program for providing media content in real-time on a web client including a browser utilizing a cache, the media content capable of being separated into a plurality of sections having a first size, the browser of the web client capable of reading and displaying the section of the media content without additional software or plug-ins, the program including instructions for:

(a) ensuring that the web client is capable of flushing the cache to allow the media content to be played in real-time;

(b) providing the plurality of sections of the media content to the web client section by section over a network; and (c) allowing the web client to flush each section of the media content from the cache in real time once each of the plurality of sections has been displayed;

wherein the browser of the web client is capable of reading and displaying the section of the media content without additional software or plug-ins;

wherein the ensuring instruction (a) further indicates that each of the plurality of sections has a second size treater than the first size if the browser is a push-enabled browser.

38. The computer-readable medium of claim 37 wherein the ensuring instructions (a) further indicate that each of the plurality of sections has the second size for a pull-enabled browser.

39. A computer-readable medium containing a program for providing media content in real-time on a web client including a browser utilizing a cache, the media content capable of being separated into a plurality of sections having a first size, the browser of the web client capable of reading and displaying the section of the media content without additional software of plug-ins, the method comprising:

(a) requesting the media content using the web client;

(b) ensuring that the web client is capable of flushing the cache to allow the media content to be played in real-time;

(c) receiving each of the plurality of sections of the media content on the web client section by section over a network;

(d) displaying each of the plurality of sections section by section; and (e) flushing each section of the media content from the cache once each of the plurality of sections has been played;

wherein the ensuring instructions (b) further indicate that each of the plurality of sections has a second size greater than the first size if the browser is a push-enabled browser.

40. The computer-readable medium of claim 39 wherein the ensuring instructions (b) further indicates that each of the plurality of sections has the second size for a pull-enabled browser.

* * * * *